Patented Aug. 9, 1932

1,870,594

UNITED STATES PATENT OFFICE

CYRIL J. STAUD AND HARRY LE B. GRAY, OF ROCHESTER, NEW YORK, ASSIGNORS TO EASTMAN KODAK COMPANY, OF ROCHESTER, NEW YORK, A CORPORATION OF NEW YORK

PROCESS OF MAKING CHLOROFORM INSOLUBLE CELLULOSE ACETATE AND THE PRODUCT THEREOF

No Drawing.    Application filed February 1, 1929.   Serial No. 336,911.

This invention relates to a method of preparing cellulose acetate.

Cellulose acetate is prepared ordinarily by treating cellulose material in a bath consisting of acetic acid and acetic anhydride in the presence of a suitable catalyst. The cellulose acetate is precipitated from the solution by pouring into a non-solvent such as water or ether. After washing the precipitate is dried and is recovered in an amorphous form which is insoluble in most of the usual solvents. It is, however, soluble in chloroform.

It is the object of the present invention to provide a method of preparing cellulose acetate in a form insoluble in chloroform and in a fibrous condition and also a method of converting the chloroform insoluble cellulose acetate into the chloroform soluble variety.

We have discovered that cellulose, when subjected to acetic anhydride of high purity and substantially free from acetic acid in the presence of a catalyst is converted into a variety of cellulose acetate which is insoluble in chloroform. The product is fibrous, i. e., retains its original fibrous form but is fully acetylated, that is to say, the acetyl value of the product corresponds to that for the triacetate. The product, though insoluble in chloroform, swells and frequently disappears when subjected to the action of chloroform, but upon evaporation the fibers reappear. The disappearance of the fibers is due probably to the fact that the swollen fiber has the same index of refraction as the liquid.

In the practice of the method it is preferable to pretreat the cellulose. Any of the usual pretreatment procedures may be employed. For example, the cellulose may be subjected to the action of acetic acid in the presence of a catalyst for a sufficient period to modify the character of the cellulose and to prepare it for the subsequent acetylation. The pretreatment bath may include, for example, acetic acid and approximately 1% of the catalyst such a sulphuric acid. The cellulose may be maintained in the pretreatment bath for a period of approximately from 24 to 48 hours at a temperature of approximately 20° C. At the conclusion of the pretreatment operation, the cellulose is separated from the acetic acid, washed until substantially all of the acid is removed, and then dried.

The acid-free cellulose is then introduced into a bath of concentrated acetic anhydride. The latter should have a concentration of 95% or higher. The acetic anhydride should contain a suitable catalyst, for example, a mixed catalyst consisting of for example 2.6 parts by weight of phosphoric acid (95% strength) and .9 parts sulphuric acid (98% strength). From one to 2 per cent of the catalyst based upon the volume of acetic anhydride is sufficient for the purpose of the invention. The cellulose remains in the acetic anhydride bath for a period of two or more days. The temperature of the bath during this period must be carefully regulated to avoid an increase in temperature which may result in degradation of the product. The temperature should not exceed 30° C. during the period of treatment.

When the treatment is terminated, that is, when suitable tests indicate that acetylation is complete, the cellulose is still in a fibrous condition. It is separated readily from the bath by filtration, and washed with acetic anhydride of the same strength as originally used, then with acetic acid followed by washing with water. When dry, it is a white fibrous material which, as hereinbefore indicated, is insoluble in chloroform.

Owing to the formation of acetic acid in the bath, a certain proportion of the cellulose is converted into chloroform soluble cellulose acetate. This may be recovered from the bath by precipitation or otherwise in accordance wth the usual practice in the preparation of chloroform soluble cellulose acetate.

The fibrous cellulose acetate which is insoluble in chloroform is soluble in certain organic solvents such as metacresol, aniline and tetrachloroethane. These and other solvents may be employed in utilizing the cellulose acetate for various commercial purposes.

The fibrous cellulose acetate is also soluble in certain inorganic acids such as nitric and phosphoric acids and is converted thereby into the chloroform soluble cellulose acetate.

Consequently, by dissolving chloroform insoluble cellulose acetate prepared according to our invention in a suitable acid medium such as concentrated nitric or phosphoric acid, and then precipitating by means of a non-solvent such as water or ether, the cellulose acetate may be recovered as an amorphous mass or as filaments corresponding to the usual variety of chloroform soluble cellulose acetate. This product is washed and dried to remove the acid and other contaminating constituents and can be utilized for various purposes. It may be hydrolyzed by suitable treatment to convert it into the acetone soluble cellulose acetate. It may be hydrolyzed in nitric acid solution, or after solution in phosphoric acid. Such solutions require approximately 1½ and 3½ hours respectively at 25°–30° C. when the ratio of acid to acetate is 350 cc. per 50 grams.

The method as described affords the possibility of preparing cellulose acetate in various forms having differing solubility characteristics and adapted therefore for various uses.

The procedure as described is subject to numerous modifications and various changes may be made therein without departing from the invention or sacrificing any of its advantages.

Having thus described our invention, what we claim as new and desire to secure by Letters Patent is:

1. The process of manufacturing chloroform insoluble cellulose acetate which comprises acetylating an undegraded cellulose in a liquid bath of concentrated acetic anhydride and a catalyst which is initially substantially free from acetic acid.

2. The process of manufacturing chloroform insoluble cellulose acetate in a fibrous form which comprises acetylating an undegraded cellulose in a liquid bath of concentrated acetic anhydride and a catalyst which is initially substantially free from acetic acid.

3. The process of manufacturing chloroform insoluble cellulose acetate which comprises acetylating an undegraded pretreated cellulose in a liquid bath of concentrated acetic anhydride and a catalyst which is initially substantially free from acetic acid.

4. The process of manufacturing chloroform insoluble cellulose acetate which comprises acetylating an undegraded cellulose in a liquid bath of concentrated acetic anhydride at a temperature not substantially exceeding 30° C. and a catalyst which is initially substantially free from acetic acid.

5. The process of manufacturing chloroform insoluble cellulose acetate in fibrous form which comprises acetylating an undegraded cellulose in a liquid bath of acetic anhydride of a concentration exceeding 95% and a catalyst.

6. A cellulose acetate in fibrous form which is insoluble in chloroform but soluble in metacresol, aniline, and tetrachloroethane.

7. The process of manufacturing chloroform insoluble cellulose acetate which comprises pretreating cellulose with acetic acid and sulfuric acid, removing the acid and then acetylating the cellulose in a bath containing initially a catalyst and acetic anhydride as the sole acetyl-containing material present.

8. The process of manufacturing chloroform insoluble cellulose acetate which comprises acetylating cellulose in a liquid bath containing a catalyst consisting of a mixture of sulfuric and phosphoric acids and concentrated acetic anhydride, which is initially substantially free from acetic acid.

9. The process of manufacturing cellulose acetate which comprises acetylating cellulose in a bath of concentrated acetic anhydride and a catalyst which is initially substantially free from acetic acid to form a chloroform insoluble cellulose acetate and subsequently converting the cellulose acetate to chloroform solubility by dissolving in a mineral acid solvent.

Signed at Rochester, New York this 28th day of January 1929.

HARRY LE B. GRAY.
CYRIL J. STAUD.